United States Patent [19]

Virnig et al.

[11] 4,160,807
[45] Jul. 10, 1979

[54] SULFONAMIDO OXIMES, METAL COMPLEXES THEREOF, AND SOLUTIONS CONTAINING SUCH COMPOUNDS FOR USE IN EXTRACTION OF METAL VALUES

[75] Inventors: Michael J. Virnig, Fridley; Kenneth D. MacKay, Circle Pines, both of Minn.

[73] Assignee: Henkel Corporation, Minneapolis, Minn.

[21] Appl. No.: 909,226

[22] Filed: May 24, 1978

[51] Int. Cl.$^2$ ............... C07C 143/78; C07C 143/79; B01D 11/04
[52] U.S. Cl. ..................... 423/24; 252/182; 260/465 E; 260/556 AR; 260/556 B; 423/100; 423/139
[58] Field of Search ............... 252/182; 260/556 AR, 260/556 B, 465 E; 423/24, 100, 139

[56] References Cited

U.S. PATENT DOCUMENTS

| | | | |
|---|---|---|---|
| 3,714,247 | 1/1973 | Dixon | 260/556 AR |
| 4,028,412 | 6/1977 | Gehlhaus et al. | 423/24 X |
| 4,029,704 | 6/1977 | Anderson | 423/24 X |
| 4,100,163 | 7/1978 | Virnig | 423/24 X |

FOREIGN PATENT DOCUMENTS 221693 10/1968 U.S.S.R. ............... 260/556 AR

Primary Examiner—Thomas Waltz
Attorney, Agent, or Firm—Patrick J. Span; Elizabeth Tweedy; Forrest L. Collins

[57] ABSTRACT

Certain sulfonamido oximes, metal complexes thereof and solutions of said compounds in essentially water-immiscible, liquid hydrocarbon solvents are disclosed. The sulfonamido oximes have the general structural formula:

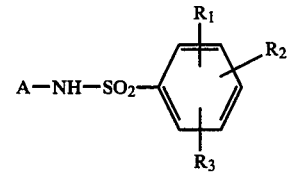

wherein A, $R_1$, $R_2$ and $R_3$ are as defined in the specification and claims hereof. Particular metal values are recovered from their aqueous solutions by using sulfonamido oximes dissolved in essentially water-immiscible liquid hydrocarbon solvents. The extraction process involves contacting the metal value containing aqueous solution with the solution of the sulfonamido oxime in essentially water-immiscible liquid hydrocarbon solvent and stripping the mertal values from the loaded organic phase.

83 Claims, No Drawings

SULFONAMIDO OXIMES, METAL COMPLEXES THEREOF, AND SOLUTIONS CONTAINING SUCH COMPOUNDS FOR USE IN EXTRACTION OF METAL VALUES

The present invention is directed to novel sulfonamido oximes, organic solvent solutions thereof, metal complexes of such sulfonamido oximes, organic solvent solutions of such complexes and the method of using said sulfonamido oximes to extract metal values from aqueous solution.

Liquid ion exchange recovery of metal values from aqueous solutions thereof has in the past ten years or so become a mature commercial operation. Such processing has been described as being deceptively simple since all that is really happening is the transfer of a metal value from Phase A (aqueous) to Phase B (organic) and thence from Phase B to Phase C (aqueous). However, complexities of liquid ion exchange arise in a number of areas including (1) synthesis and manufacture of the reagent system, (2) evaluation of the system's capabilities, and (3) engineering application leading to large scale metal recovery.

The key to a successful application of liquid ion exchange is the reagent. In this respect, the reagent should desirably meet a number of criteria. In the first instance, the reagent should complex with or react with a metal or group of metals and such complexing or reaction should be relatively fast in order to avoid having to use large holding tanks or reaction vessels. It is also desirable that the reagent exhibits preference for a single metal where the aqueous starting solutions contain a number of metal values. Such selectivity can often be optimized at designated pH ranges. The reagent should also desirably complex or react quantitatively with the metal under the extraction conditions. Additionally, the reagent, as well as the resulting metal complex, must exhibit satisfactory solubility in the essentially water-immiscible organic solvent being used. Further, the reagent-metal reaction or complexing should be reversible so that the metal can be stripped from the organic phase. For economic reasons, the reagent should be relatively stable so that it can be recycled repeatedly. Also, it should be essentially water insoluble to prevent significant loss into the aqueous phase or phases. Furthermore, the reagent should not cause or stabilize emulsions. Again and principally for economic reasons, the reagent should not react with or load significant quantities of acid, for example, from aqueous acidic stripping solutions. And, of course, the cost of the reagent should be such that the liquid ion exchange process can be operated at a profit.

Of significant, but lesser, importance, is the selection of the essentially water-immiscible solvent to be used in the liquid ion exchange process. Such selection is important principally from a cost standpoint, especially in the recovery of the more common metals. Existing commercial operations for copper recovery, for example, generally employ aliphatic kerosenes because of the low cost thereof. Thus the cost of the reagent and the solvent is intertwined in providing the desired overall economics of the process being commercialized.

One of the most extensively used systems in commercial operation in the last decade for copper recovery has employed benzophenoximes or combination reagents including a benzophenoxime component. While being economic, improvements can be made since the said benzophenoximes do not have total selectivity for copper over iron, for example. Other types of reagents which have been proposed for use in copper recovery such as the alkenyl substituted 8-hydroxyquinolines also have certain drawbacks.

More recently, novel sulfonamidoquinolines, particularly useful in liquid ion exchange metal recovery processes were discovered. These compounds and their use in liquid ion exchange metal recovery processes are the subject of commonly assigned applications Ser. Nos. 843,534, now pending, and 845,932, now abandoned. The applications further make reference to certain low molecular weight sulfonamidoquinolines as reported by Billman and Chernin in Analytical Chemistry, Vol. 34, No. 3, March 1962, pp. 408–410 and U.S. Pat. Nos. 3,268,538 and 3,337,555.

It has now been discovered that certain novel sulfonamido oximes as more fully defined hereinafter are useful in liquid ion exchange recovery processes. The new compounds of the present invention have the following structural formula:

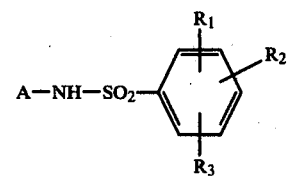

wherein A is a radical selected from the group consisting of

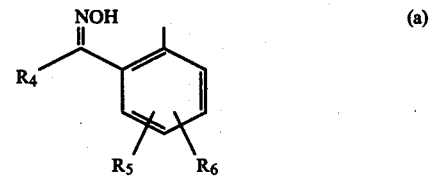 (a)

and

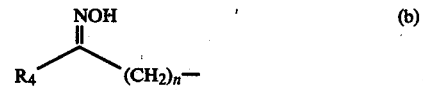 (b)

in which $R_4$ is a member selected from the group consisting of hydrogen, linear and branched chain alkyl and a radical of the structure

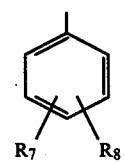

in which $R_7$ and $R_8$, which may be the same or different, are selected from the group consisting of hydrogen, linear and branched chain alkyl, halogen, nitro, nitrile, lower alkoxy and trifluoromethyl; $R_5$ and $R_6$, which may be the same or different, are selected from the group consisting of hydrogen, linear and branched chain alkyl, halogen, nitro, nitrile, lower alkoxy, and trifluoromethyl; n is an integer of 1 or 2; and, $R_1$, $R_2$, and $R_3$, which may be the same or different, are selected from the group consisting of hydrogen and linear and branched chain alkyl. When alkyl, the R groups contain from 1 to 20 carbon atoms and, it is generally preferred that the compounds contain at least one alkyl group having 8 or more carbon atoms. Additionally, the alkyl groups may be linear or branched chain, although branched chain is preferred.

The compounds of the present invention are also characterized as having solubilities in essentially water-immiscible liquid hydrocarbon solvents of at least 2% by weight. Correspondingly, they are further characterized in that the copper ($Cu^{++}$) complexes of the compounds have solubilities of at least 2% by weight in the said water-immiscible, liquid hydrocarbon solvents. Especially preferred compounds of the invention are those which exhibit solubilities of at least 2% by weight in both pure and complexed form, in aliphatic or aromatic hydrocarbons, or mixtures thereof, having flash points of at least 150° F. Thus, the compounds of the invention may preferably be further characterized as having substituents containing a sufficient number of carbon atoms and/or branching in the alkyl chains to provide at least the minimum 2% solubility in the aforementioned solvents.

The preference for alkyl substituents containing at least 8 carbon atoms and/or possessing a branched chain structure is due to their contribution to the solubilities of the compounds in the above described solvents. The beneficial effect provided by the number of carbon atoms is obtained by having an alkyl substituent of at least 8 carbon atoms or more than one alkyl substituent in which the sum of the carbon atoms is at least 8. Accordingly, the most preferred compounds of the present invention are those possessing one or more branched chain alkyl substituents having at least 8 carbon atoms or those possessing branched chain alkyl substituents in which the sum of the carbon atoms is at least 8.

According to a preferred embodiment, the novel compounds of the present invention are generally represented by the structural formula:

A—NH—SO$_2$—[structure with $R_1$, $R_2$, $R_3$]

in which $R_1$, $R_2$, and $R_3$ are as defined above, and A is a benzophenone oxime or acetophenone oxime radical. Exemplary of these preferred compounds, are those wherein A is a radical represented by the structures:

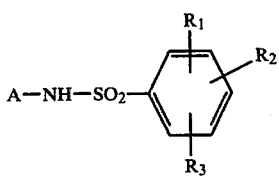

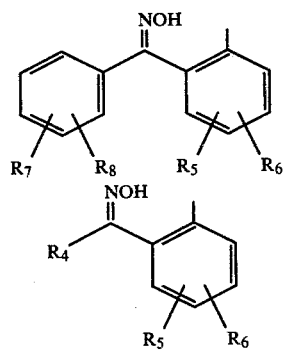

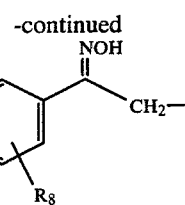

in which $R_5$, $R_6$, $R_7$, and $R_8$ are as previously defined and $R_4$ is a linear or branched chain alkyl containing from 1 to 20 carbon atoms. Of these preferred compounds, those in which $R_5$, $R_6$, $R_7$ and $R_8$ are hydrogen and $R_4$ is a lower alkyl, particularly methyl are most preferred. To insure that these compounds have the requisite 2% by weight minimum solubility in the essentially water-immiscible liquid hydrocarbon solvents, it is further preferred that at least one of the substituents represented by $R_1$, $R_2$ and $R_3$ in the general structural formula be an alkyl containing at least 8 carbon atoms, such as dodecyl. Exemplary of these most preferred compounds are 2-(Dodecylbenzenesulfonamido)benzophenone oxime, 2'-(Dodecylbenzenesulfonamido)acetophenone oxime, and 2-(Dodecylbenzenesulfonamido)acetophenone oxime.

The novel compounds of the present invention are prepared from the respective sulfonamido ketone as follows. The sulfonamido ketone, hydroxylamine hydrochloride, sodium acetate and methanol are placed in a round bottom flask, stirred and heated to reflux. The reaction mixture is continuously stirred at reflux under a nitrogen atmosphere. The reaction mixture is poured into from 500 ml to 1 liter of water and the product is extracted with Skelly C, (available from Skelly Oil Co., and consists of mostly n-heptane, b.p. range 88°–100° C.). The organic extract is washed with methanolic sodium bicarbonate solution until good phase separations are obtained. The organic extract is then washed with brine, dried over sodium sulfate, filtered and evaporated in vacuo to isolate the sulfonamido oxime reaction product.

The sulfonamido ketone from which the compounds of the present invention are prepared are themselves prepared from the respective amino ketone as follows. The amino ketone is dissolved in pyridine and the solution is cooled to 0°–10° C. Substituted benzenesulfonyl chloride is then added slowly with stirring. During this addition, the reaction temperature is maintained at 0° to 30° C. After the sulfonyl chloride has been completely added, the reaction mixture is allowed to warm to room temperature and stirred for a time from 1 to 12 hours. The reaction mixture is then heated to 70° to 100° C. and stirred for 1 hour. Approximately 100 ml water is added and the reaction mixture is stirred at 75° to 95° C. for 30 minutes. The reaction mixture is poured into 250 ml to 1 liter water and the sulfonamido ketone is recovered by extraction with an organic solvent, such as, Skelly C, benzene, or toluene, or by filtration if the product crystallizes in the aqueous solution. If extraction is employed, the organic extract is washed with methanolic sodium bicarbonate followed by 25 gpl solution of sulfuric acid. The methanolic bicarbonate washes are repeated until clear phase separations are obtained. The organic extract is then washed with brine, dried over sodium sulfate, filtered, and evaporated in vacuo. Products recovered by filtration are purified by recrystallization.

The starting substituted benzenesulfonyl chlorides may be prepared from the corresponding alkyl benzene, alkylbenzenesulfonic acid, sodium sulfonate salt or alkyl halide, as described in commonly assigned applications Ser. Nos. 843,534, now pending, and 845,932, now abandoned, which disclosures are hereby incorporated by reference. Further details of the synthesis of the compounds of the present invention, including information concerning the preparation of the various starting materials, are found in the Examples which follow the description of the invention.

It is generally difficult to prepare the sulfonamido oximes of the present invention having two large branched chain substituents on adjacent carbon atoms of the aromatic rings due to the problem of steric hindrance. Under such circumstances, it is preferred that the substituents represented by the various R designations are arranged on the aromatic rings of the compounds of the present invention so as to be on non-adjacent carbon atoms. While this preferred embodiment facilitates preparation of the sulfonamide compounds of the invention, it does not affect the solubility of the compounds in the essentially water-immiscible, liquid hydrocarbon solvents or their ability to extract metal values from aqueous solutions. Thus, sulfonamido oximes with substituents on vicinal carbon atoms of the aromatic rings, are equally effective as extractants in the process of the invention, although they are more difficult to prepare.

The process of the present invention is a liquid ion exchange process in which any one of the sulfonamido oxime compounds of the invention is dissolved in an essentially water-immiscible, liquid hydrocarbon solvent and the resulting solution is contacted with a metal containing aqueous phase to extract at least a portion of the metal values into the organic phase. The phases are then separated and metal values are stripped from the loaded organic phase by the use of an aqueous stripping medium.

A wide variety of essentially water-immiscible, liquid hydrocarbon solvents can be used in the metal recovery process of the present invention. These include: aliphatic and aromatic hydrocarbons such as kerosenes, benzene, toluene, xylene and the like. The choice of the said essentially water-immiscible liquid hydrocarbon solvent for particular commercial operations will depend on a number of factors including the design of the solvent extraction plant (i.e., mixer-settlers, Podbielniak extractors, etc.), the value of the metal being recovered, disposal of plant effluent and the like. The process of the present invention finds particular use in the extraction recovery of the major, non-ferrous, transition metals—i.e., copper, nickel, zinc, cobalt(II) and cobalt(III), as will be described more fully hereinbelow. Essentially, all of the major plants in operation currently for the recovery of these metals (particularly $Cu^{++}$) use mixer-settlers with relatively large organic inventories and some loss of solvent invariably occurs by evaporation, entrainment in the aqueous, and the like. Under these circumstances, preferred solvents for use in the metal recovery processes of the present invention are the aliphatic and aromatic hydrocarbons having flash points of 150° F. and higher and solubilities in water of less than 0.1% by weight. These solvents are also essentially non-toxic and chemically inert and the costs thereof are currently within practical ranges—i.e., normally less than one dollar (U.S.) per gallon to as low as 30¢ (U.S.) or so. Representative commercially available solvents are Kermac 470B (an aliphatic kerosene available from Kerr-McGee—Flash Point 175° F.), Chevron Ion Exchange Solvent (available from Standard Oil of California—Flash Point 195° F.), Escaid 100 and 110 (available from Exxon-Europe—Flash Point $\approx$ 180° F.), Norpar 12 (available from Exxon-U.S.A.—Flash Point 160° F.), Conoco C-1214 (available from Conoco—Flash Point 160° F.), Aromatic 150 (an aromatic kerosene available from Exxon-U.S.A.—Flash Point 150° F.) and various other kerosenes and petroleum fractions available from other oil companies.

The present invention thus additionally relates to new compositions wherein the sulfonamido oxime compounds of the invention are dissolved in the essentially water-immiscible, liquid hydrocarbon solvents described above. In this regard, liquid ion exchange reagents are often sold as solutions in organic solvents. These new compositions consist essentially of solutions of at least 2% by weight of the sulfonamido oxime in essentially water-immiscible, liquid hydrocarbon solvents. When sold as concentrates, the solutions will preferably contain from about 25 to 75% by weight of the sulfonamido oxime.

In the process of the present invention, the organic solvent solutions will preferably contain from about 2 to 75% by weight of the heterocyclic sulfonamide compounds and even more preferably from about 5 to 20% by weight thereof. Additionally, volume ratios of the organic:aqueous phase vary widely since the contacting of any quantity of the sulfonamide solution with the metal containing aqueous phase will result in extraction of metal values into the organic phase. However, for commercial practicality, the organic:aqueous phase ratios are preferably in the range of about 5:1 to 1:5. For practical purposes, the extracting and stripping are normally conducted at ambient temperatures and pressures although higher or lower temperatures and/or pressures are entirely operable. Most advantageously, the entire process can be carried out continuously with the stripped organic solvent solution being recycled for contacting further quantities of metal containing solutions.

The present invention also relates to the metal complexes of the novel sulfonamido oxime compounds and to the essentially water-immiscible, liquid hydrocarbon solvent solutions thereof. The solutions consist essentially of the said solvent and at least 2% by weight, and preferably less than 75% by weight, of the metal complexes. While not normally practiced in the industry, the solutions of the metal complexes can be obtained at one location and transported to another for stripping as hereinafter described. The term "metal complex" as used herein is meant to connote compositions of the novel sulfonamido oximes with other than insignificant quantities of metal ions. Although the exact structural nature of these complexes has not been ascertained, tests have indicated that under conditions of maximum loading, particularly with $Cu^{++}$ and $Zn^{++}$ metal ions, the complexes comprise the metal and sulfonamide compound in a molar ratio of 1:2. Maximum loading, however, is not required for achieving acceptable performance in liquid ion exchange processes and hence the metal complexes are generally defined as including the designated metals in more than insignificant quantities up to maximum loading.

The metal recovery process of the present invention is useful for the recovery of the following metal values from their aqueous solutions: $Cu^{++}$, $Ni^{++}$, $Zn^{++}$, $Co^{++}$ and $Co^{+++}$. These metal values are all transition metals of Groups Ib, IIb and VIII. The extraction of these various metal from aqueous solutions depends upon a number of factors including, for example, the concentration of the metal ion, the particular anions present, and the pH of and/or ammonia concentration in the aqueous solutions, as well as the particular sulfonamido oxime chosen and its concentration in the organic phase. Generally, it is preferred to extract the metal values from ammoniacal solutions in which the preferred concentration of ammonia is from about 10 to 150 g/l. However, it is understood that for each aqueous metal solution and sulfonamide reagent solution there will be a preferred or optimum set of extraction conditions, and those skilled in the art, based on the information given herein, especially in the examples to follow, will be able, after a limited number of trial runs, to determine such preferred or optimum conditions for the respective systems under consideration. This is equally true of the stripping operations. By the term stripping is meant the transfer of at least a portion of the metal values in the loaded organic phase to the aqueous stripping medium. The metal values so stripped are desirably recovered from the aqueous stripping medium by conventional techniques, preferably electrolysis. The volume ratios of loaded organic:aqueous stripping phase can also vary widely. However, the overall object of the process is to provide a metal containing stripping solution of known composition and concentration suitable for conventional recovery techniques such as electrolysis. Accordingly, the metal will preferably be present in higher concentrations in the aqueous stripping medium than in the starting metal containing solution. To accomplish this, the loaded organic:aqueous stripping medium phase ratio will normally be in the range of about 1:1 to 10:1. The stripping medium is preferably an aqueous mineral acid solution such as 25 to 250 g/l $H_2SO_4$.

While the process of the present invention has been described as particularly effective in extracting $Cu^{++}$, $Ni^{++}$, $Zn^{++}$, $Co^{++}$ and $Co^{+++}$ metal values from aqueous solutions, it may be applied, with less effectiveness, to extract other chemically similar metal values such as $Cd^{++}$, $Hg^{++}$, $Ag^+$ and $Pb^{++}$.

The process of the invention thus provides a simple, continuous method of extracting valuable metal values from aqueous solutions. Of equal importance is the economic advantages attendant from the process which allows the extracting reagent to be stripped of metal values and recycled for subsequent loading.

To further illustrate the various objects and advantages of the present invention, the following examples are provided. It is understood that their purpose is entirely illustrative and in no way intended to limit the scope of the invention.

EXAMPLE 1

Preparation of Starting Materials

A. Friedel-Crafts Alkylations

The alkylations were carried out via the procedure of Oleson (Ind. Eng. Chem., 52, 833 (1960)).

Approximately one-half to two-thirds of the starting aromatic hydrocarbon and the aluminum chloride were placed in a round bottom three-neck flask fitted with mechanical stirrer, addition funnel, thermocouple well or thermometer, and a condenser. A small portion of water (2 to 10 drops) was added. A solution of the olefin in the remainder of the aromatic hydrocarbon was added slowly with stirring to the reaction vessel. The reaction temperature was maintained somewhere in the range from 0° C. to 50° C. After addition was complete, the reaction mixture was stirred for an additional 15 to 20 minutes while the reaction temperature was maintained. A 10% hydrochloric acid solution (500 ml) was added and the mixture was stirred for 5 minutes. The phases were separated. The organic was washed twice with 2–5% sodium hydroxide, once with brine, and the excess aromatic was stripped off in vacuo. The product was fractionally distilled through a Vigreaux column under vacuum. The ratios of reactants, boiling points, and yields can be found in Table A.

TABLE A

| | | FRIEDEL-CRAFTS ALKYLATIONS | | | | | | |
|---|---|---|---|---|---|---|---|---|
| | | AROMATIC | | | REACTION TEMP | BOILING POINT | | |
| PRODUCT | RUN | HYDROCARBON | OLEFIN | AlCl$_3$ | °C. | mm of Hg | °C. | Yield |
| Decyltoluene | A | Toluene 5m | 1-Decene 1m | 0.05m | 40 | 0.45 | 95–100 | 67 |
| (Decylmethyl- benzene) | B | Toluene 10m | 1-Decene 1m | 0.025m | 0–5 | * | 150–155 | 79.9 |
| | C | Toluene 5m | 1-Decene 0.5m | 0.025m | 40 | 0.15 | 80–85 | 73 |
| | D | Toluene 71.4m | 1-Decene 7.6m | 0.357m | 40 | 0.55–0.8 | 106–124 | 76 |

*Water aspirator vacuum

B. Preparation of the sulfonyl chloride

The sulfonyl chlorides were prepared by two different routes starting from either the alkylbenzene or the alkylbenzenesulfonic acid.

Alkylbenzenesulfonyl chloride from the alkylbenzene

A solution of the alkylbenzene in 1,1,2-trichloroethane (TCE) was cooled to 10° C. and chlorosulfonic acid was added slowly with stirring. The pot temperature was maintained at 10°–15° C. during the addition. After the addition was complete, the reaction mixture was stirred at 10°–15° C. for 15 minutes and then allowed to warm to ambient temperature while stirring for 2–3 hours. The thionyl chloride was added to the stirring reaction mixture. The reaction mixture was heated slowly (1–3 hours) to 90°–120° C. and then held at 90°–120° C. for 30 minutes. A sample was then withdrawn from the reaction mixture. If the presence of the sulfonic acid anhydride was detected by IR, an additional mole of thionyl chloride was added and the reaction mixture was stirred at 90°–120° C. for one additional hour. The excess thionyl chloride and TCE were stripped from the reaction mixture in vacuo. The crude sulfonyl chloride was purified by molecular distillation. Ratios of reactants, reaction temperatures, and yields are given in Table B.

TABLE B
PREPARATION OF ALKYLBENZENESULFONYL CHLORIDES FROM THE ALKYLBENZENE

| PRODUCT | RUN | ALKYL-BENZENE (m) | ClSO$_3$H (m) | SOCl$_2$ (m) | TCE (ml) | RXN TEMP °C. | DISTILLED YIELD (%) |
|---|---|---|---|---|---|---|---|
| Dodecylbenzenesulfonyl chloride | | 4.34 | 4.34 | 8.68 | 3.67 | 110 | 64 |
| Decyltoluenesulfonyl chloride | A | 5.87 | 5.87 | 11.74 | 500 | 120 | 67 |
| | B | 5.53 | 5.53 | 11.07 | 442 | 110 | 73 |
| | C | 0.25 | 0.275 | 0.55 | 10 | 116 | 56 |

Dodecylbenzenesulfonyl chlorides from the dodecylbenzenesulfonic acids

The sulfonic acid was added slowly over a four-hour period to a stirring solution of thionyl chloride (1 l.) in Skelly C (500 ml). The temperature controller was set for 95° C. and the reaction mixture was heated to reflux. The reaction mixture required approximately two hours to reach 95° C. After stirring at 95° C. overnight, the excess thionyl chloride and Skelly C were stripped off under aspirator vacuum. An additional 50 ml of Skelly C was added and then distilled off under aspirator vacuum to remove the last traces of thionyl chloride. The crude product was then purified by molecular distillation. Amounts of starting acid and yields are given in Table C.

TABLE C
CONVERSION OF SULFONIC ACIDS BY THIONYL CHLORIDE

| PRODUCT | ACID (m) | CRUDE % | DISTILLED (%) |
|---|---|---|---|
| Dodecylbenzenesulfonyl chloride | 5:82 | — | 94 |

EXAMPLE 2
General Preparation of Sulfonamido Oxime Compounds

A. Preparation of Sulfonamido Ketones

The appropriate amino ketone was dissolved in pyridine. The solution was cooled to 0° to 10° C. and the sulfonyl chloride was added slowly with stirring. During the addition, the reaction temperature was maintained at 0° to 30° C. After the addition was complete, the reaction mixture was allowed to warm to room temperature and stirred for 1 to 12 hours. The reaction mixture was heated to 70° to 100° C. and stirred for 1 hour. Water (100 ml) was added and the reaction mixture was stirred at 75° to 95° C. for 30 minutes. After pouring the reaction mixture into water (250 ml to 1 liter), the sulfonamido ketone was recovered by extraction with an organic solvent, i.e., Skelly C, benzene, toluene, or by filtration in the case of those which crystallized. After extraction, the organic extract was washed with methanolic sodium bicarbonate and then with 25 gpl sulfuric acid. The methanolic bicarbonate washes were repeated until clean phase separations were obtained. The organic was then washed with brine, dried over sodium sulfate, filtered, and evaporated in vacuo. Products recovered by filtration were purified by recrystallization. The resultant products were characterized by infra red (IR) and nuclear magnetic resonance (NMR). The ratios of reactants, solvents, and yields are given in Table D.

TABLE D

| Product | Run | Amino ketone (m) | Sulfonyl chloride (m) | Pyridine | Extraction solvent | Yield (%) |
|---|---|---|---|---|---|---|
| 2-Dodecylbenzenesulfonamido-benzophenone | A | 0.1 | 0.1 | 150 ml. | Skelly C | 83 |
| | B | 0.1 | 0.11 | 100 ml. | Skelly C | 100 |
| 5-Chloro-2-(dodecylbenzene-sulfonamido)benzophenone | A | 0.26 | 0.26 | 200 ml. | Skelly C | 80 |
| | B | 0.17 | 0.17 | 100 ml. | Skelly C | 96 |
| | C | 0.2 | 0.2 | 120 ml. | Skelly C | 95 |
| 2'-(Dodecylbenzene-sulfonamido)acetophenone | | 0.15 | 0.15 | 300 ml. | Skelly C | 73 |

B. Preparation of Sulfonamido Oximes

The appropriate sulfonamido ketone, hydroxylamine hydrochloride, sodium acetate, and methanol were placed in a round bottom flask. The reaction mixture was stirred and heated to reflux. The reaction mixture was stirred at reflux under a nitrogen atmosphere. The reaction mixture was poured into water (500 ml to 1 liter) and the product was extracted with Skelly C. The organic extract was washed with methanolic sodium bicarbonate solution until good phase separations were obtained. The organic was then washed with brine, dried over sodium sulfate, filtered, and evaporated in vacuo. The resultant products were characterized by IR and NMR. The ratios of reactants and solvent are given in Table E.

TABLE E

| Product | Run | Sulfonamido ketone (m) | Hydroxylamine hydrochloride (m) | Sodium acetate (m) | Methanol (ml) | Reaction time (hr) | Yield (%) |
|---|---|---|---|---|---|---|---|
| 2-(Dodecylbenzenesulfonamido) benzophenone oxime | A | 0.08 | 0.096 | 0.29 | — | 96 | 100 |
| | B | 0.1 | 0.12 | 0.35 | 150 | 96 | 97 |
| 5-Chloro-2-(dodecylbenzene-sulfonamido) benzophenone oxime | A | 0.20 | 0.24 | 0.72 | 300 | 96 | 98 |
| | B | 0.1 | 0.12 | 0.35 | 100 | 45 | 100 |
| | C | 0.1 | 0.12 | 0.35 | 100 | 120 | 100 |

TABLE E-continued

| Product | Run | Sulfon-amido ketone (m) | Hydroxylamine hydrochloride (m) | Sodium acetate (m) | Methanol (ml) | Reaction time (hr) | Yield (%) |
|---|---|---|---|---|---|---|---|
| 2'-(Dodecylbenzenesulfonamido) acetophenone oxime | | 0.11 | 0.13 | 0.25 | 350 | 48 | 99 |
| 2-(Dodecylbenzenesulfonamido) acetophenone oxime | | 0.12 | 0.14 | 0.28 | 350 | 30 | 95 |

EXAMPLE 3

Preparation of 2-(dodecylbenzenesulfonamido)benzophenone

Starting materials:
0.1 mole (19.7 gm) 2-aminobenzophenone
0.1 mole dodecylbenzenesulfonylchloride
150 ml pyridine The sulfonyl chloride was added to a solution of the 2-aminobenzophenone in pyridine with stirring at 0° C. The reaction mixture was allowed to warm to room temperature and continuously stirred overnight. Thereafter, the reaction mixture was heated to 70° C. and poured into 600 ml water. The aqueous solution was extracted three times with Skelly C solvent. The combined Skelly C extracts were then washed repeatedly with a 5% NaHCO₃ methanolic solution (40% methanol, 60% water) until the phases separated. The organic phase was dried over Na₂SO₄, filtered and heated to boiling. After addition of 5 gm norite, the solution was filtered through celite and evaporated to an oil in vacuo. 42.1 gm (83% yield) of a yellow oil was obtained. NMR and IR analysis confirmed the product to be 2-(dodecylbenzenesulfonamido)benzophenone.

EXAMPLE 4

Preparation of 5-chloro-2-(dodecylbenzenesulfonamido)benzophenone

Starting materials:
0.26 mole (60 gm) 2-amino-5-chlorobenzophenone
0.26 mole (89 gm) dodecylbenzenesulfonyl chloride
200 ml pyridine The sulfonyl chloride was added to the benzophenone in pyridine slowly with stirring. The reaction mixture was stirred overnight at room temperature. The reaction mixture was heated to 100° C. for one hour and then 200 ml water was added. The reaction mixture was heated for an additional hour at 100° C. and then poured into 1.5 liters water and extracted with three 250 ml portions of Skelly C solvent. The resulting organic solution was washed twice with 200 ml of a 10% sulfuric acid solution, four times with 200 ml of a 5% NaHCO₃ aqueous methanolic solution (40% methanol), once with a 2% hydrochloric acid solution and once with brine, dried over Na₂SO₄, filtered and evaporated to dryness in vacuo. 111 gm (80% yield) of a dark oil was obtained. NMR and IR analysis indicated the compound to be 5-chloro-2-(dodecylbenzenesulfonamido)benzophenone, and suggested the presence of two different chloro isomers.

EXAMPLE 5

Preparation of 2'-(dodecylbenzenesulfonamido)acetophenone

Starting materials:
0.15 mole (20.2 gm) 2'-aminoacetophenone
0.15 mole dodecylbenzenesulfonyl chloride
300 ml pyridine The sulfonyl chloride was added directly with stirring to a solution of the 2'-aminoacetophenone in pyridine at 0° C. The solution was stirred at 0° C. for an hour, allowed to warm to room temperature and then continuously stirring overnight. Thereafer, the reaction mixture was heated to 70° C. and poured into 600 ml of water. The aqueous solution was extracted three times with Skelly C solvent. The combined organic extracts were then washed repeatedly with a 5% NaHCO₃ aqueous methanolic solution (40% methanol) until good phase separation was achieved. The organic phase was dried over Na₂SO₄, filtered and heated to boiling. After addition of 5 gm of norite, the solution was filtered through celite and evaporated to an oil in vacuo. 48.2 gm of pale yellow oil was obtained. NMR and IR analysis confirmed the structure of the compound to be 2'-(dodecylbenzenesulfonamido)acetophenone.

EXAMPLE 6

Preparation of 2-(dodecylbenzenesulfonamido)acetophenone

Starting materials:
0.15 mole (25 gm) 2-aminoacetophenonehydrochloride
0.15 mole dodecylbenzenesulfonyl chloride
400 ml pyridine Sulfonyl chloride was dissolved in a solution of the 2-aminoacetophenone hydrochloride in pyridine with stirring at 0° C. Stirring at 0° C. continued for 30 minutes after which the reaction mixture was warmed to room temperature and stirred for another 30 minutes, then heated to 60° C. and stirred for an hour. The reaction mixture was poured into 600 ml H₂O and extracted three times with 30 ml Skelly C solvent. The extracts were combined and washed with a 5% NaHCO₃ aqueous methanolic solution (40% methanol). The organic phase was then washed with 3% HCl, dried over Na₂SO₄ and filtered. The organic solution was then heated to boiling, after which 5 gm of norite was added. The solution was filtered through celite and evaporated in vacuo. 54 gm of an oil (82% yield) was obtained. NMR and IR analysis confirmed the structure to be 2-(dodecylbenzenesulfonamido)acetophenone.

EXAMPLE 7

Preparation of 2-(dodecylbenzenesulfonamido)benzophenone oxime

Starting materials:
0.08 mole (49.2 gm) 2-(dodecylbenzenesulfonamido)benzophenone
0.096 mole (6.62 gm) hydroxylamine hydrochloride
0.288 mole (23.6 gm) sodium acetate A solution of the benzophenone, hydroxylamine hydrochloride and sodium acetate in methanol was stirred at reflux under a nitrogen atmosphere. The reaction mixture was poured into 600 ml water and extracted twice with Skelly C solvent. The organic extracts were combined, washed with a 5% NaHCO$_3$ aqueous methanolic solution (40% methanol), dried over Na$_2$SO$_4$, filtered and evaporated to dryness in vacuo. 44.5 gm of a viscous oil was obtained. NMR and IR analysis confirmed the structure of the product to be 2-(dodecylbenzenesulfonamido)benzophenone oxime.

EXAMPLE 8

Preparation of 5-chloro-2-(dodecylbenzenesulfonamido)benzophenone oxime

Starting materials:
0.206 mole (111 gm) 5-chloro-2-(dodecylbenzenesulfonamido) benzophenone
0.246 mole (16.97 gm) hydroxylamine hydrochloride
0.717 mole (60.47 gm) sodium acetate 300 ml methanol Starting materials were placed in a flask equipped with a mechanical stirrer and condenser. The reaction was carried out under an atmosphere of nitrogen. The reaction mixture was heated to reflux and allowed to reflux for two days. Thereafter the mixture was poured into 600 ml water and extracted twice with 500 ml portions Skelly C solvent. The organic extracts were combined, washed twice with 300 ml water, then brine, dried over Na$_2$SO$_4$, filtered and evaporated to dryness in vacuo yielding 111.5 gm of a solid product. NMR and IR analysis confirmed the structure of the product to be 5-chloro-2-(dodecylbenzenesulfonamido)benzophenone oxime with traces of the hydrocarbon solvent present.

EXAMPLE 9

Preparation of 2'-(dodecylbenzenesulfonamido)acetophenone oxime

Starting materials:
0.108 mole (48.2 gm) 2'-(dodecylbenzenesulfonamido)acetophenone
0.125 mole (8.6 gm) hydroxylamine hydrochloride
0.25 mole (20.5 gm) sodium acetate
350 ml methanol A solution of the starting materials was prepared and refluxed with stirring for 48 hours under a nitrogen atmosphere. The reaction mixture was then poured into 600 ml water and extracted twice with Skelly C solvent. The extractants were combined, washed with a 5% NaHCO$_3$ aqueous methanolic solution (40% methanol), dried over Na$_2$SO$_4$, filtered and evaporated to dryness in vacuo yielding 49.2 gm of product. NMR and IR analysis confirmed the structure of the compound to be 2'-(dodecylbenzenesulfonamido)acetophenone oxime.

EXAMPLE 10

Preparation of 2-(dodecylbenzenesulfonamido)acetophenone oxime

Starting materials:
0.12 mole (54 gm) 2-(dodecylbenzenesulfonamido)acetophenone
0.14 mole (9.6 gm) hydroxylamine hydrochloride
0.28 mole (23 gm) sodium acetate
350 ml methanol A solution of the starting materials was prepared and stirred at reflux for 30 hours under a nitrogen atmosphere. Thereafter, the reaction mixture was poured into 600 ml water and extracted twice with Skelly C solvent. The combined organic extracts were washed with a 5% NaHCO$_3$ aqueous methanol solution (40% methanol), dried over Na$_2$SO$_4$, filtered and evaporated to dryness in vacuo leaving 52.2 gm of product. NMR and IR analysis confirmed the structure of the product to be that of 2-(dodecylbenzenesulfonamido)acetophenone oxime.

EXAMPLE 11

Extraction of Metal Values

To determine the ability of the various sulfonamido oxime compounds of the present invention to extract metal values from aqueous solutions, tests were conducted in accordance with the following procedures.

A 0.1 molar solution of the sulfonamide compound in an identified essentially water-immiscible liquid hydrocarbon solvent and five aqueous solutions of the following compositions were used:

| Metal | Composition |
| --- | --- |
| Cu$^{++}$ | 0.05 M CuSO$_4$ (3.2 g./l. Cu$^{++}$), 0.4 M NH$_3$, and 0.1 M (NH$_4$)$_2$SO$_4$ |
| Ni$^{++}$ | 0.05 M NiSO$_4$ (2.0 g./l. Ni$^{++}$), 0.4 M NH$_3$, and 0.1 M (NH$_4$)$_2$SO$_4$ |
| Zn$^{++}$ | 0.05 M ZnSO$_4$ (3.2 g./l. Zn$^{++}$), 0.4 M NH$_3$, and 0.1 M (NH$_4$)$_2$SO$_4$ |
| Co$^{++}$ | 0.025 M CoSO$_4$ (1.5 g./l. Co$^{++}$), 1.7 M NH$_3$, and 0.1 M (NH$_4$)$_2$SO$_4$ prepared as needed under an atmosphere of nitrogen |
| Co$^{+++}$ | 0.025 M CoSO$_4$ (1.5 g./l. Co$^{++}$), 1.7 M NH$_3$, and 0.1 M (NH$_4$)$_2$CO$_3$ (air oxidized to Co$^{+++}$) |

Portions of the organic solution were shaken with the five aqueous solutions at an organic:aqueous phase volume ratio of 1:1 for one hour at ambient temperature. The organic phases were then analyzed for metal content. If a third phase was present, both the organic and aqueous phases were clarified and analyzed. Table F summarizes the data obtained from the extraction tests for various sulfonamido oxime reagents of the present invention.

TABLE F

| REAGENT | SOLVENT | [Cu$^{+2}$], org. | [Ni$^{+2}$], org. | [Co$^{+2}$], org. | [Co$^{+3}$], org. | [Zn$^{+2}$], org. |
| --- | --- | --- | --- | --- | --- | --- |
| 2-(Dodecylbenzenesulfonamido) benzophenone oxime | Napoleum 470 | 2.85 | 1.57 | 1.36 | 0.609 | 1.21 |
| 5-Chloro-2-(dodecylbenzenesulfonamido)benzophenone oxime | Kermac 470B | 2.68 | 1.55 | 1.30 | 0.91 | 1.57 |
| 2'-(Dodecylbenzenesulfonamido) acetophenone oxime | Napoleum 470 | 3.07 | 0.606 | 1.36 | 0.0063 | 0.520 |
| 2-(Dodecylbenzenesulfonamido) | Napoleum | 1.62 | 0.760 | 0.950 | 0.245 | 0.940 |

TABLE F-continued

| REAGENT | SOLVENT | $[Cu^{+2}]$, org. | $[Ni^{+2}]$, org. | $[Co^{+2}]$, org. | $[Co^{+3}]$, org. | $[Zn^{+2}]$, org. |
|---|---|---|---|---|---|---|
| acetophenone oxime | 470 | | | | | |

All concentrations in grams per liter.

EXAMPLE 12
pH Isotherms

To determine the extent of extraction of various metal ions as a function of pH, tests were conducted as follows. Portions of a 0.1 molar solution of a particular sulfonamido oxime in an identified essentially water-immiscible liquid hydrocarbon solvent were shaken with aqueous solutions composed of equivolumes of the following components:

Component A—0.2 M metal sulfate solution in water

Component B—water or sulfuric acid or sodium hydroxide solutions ranging from 0.01 to 0.1 M Component B was selected in such a manner as to ensure the desired pH of the aqueous raffinate. In each test, the organic solution and aqueous solution were shaken at an organic:aqueous phase volume ratio of 1:1 for one hour at ambient temperature. Subsequent analysis of the organic phase for metal content and the aqueous phase for pH generated the data contained in Tables G-J which demonstrates the degree of metal extraction as a function of pH for the particular reagent systems under study. In the tables concentrations are given in grams per liter unless otherwise indicated.

TABLE G

| 2-(Dodecylbenzenesulfonamido)benzophenone oxime in Kermac 470B | | | | | | | | | |
|---|---|---|---|---|---|---|---|---|---|
| Cu | | Ni | | $Co^{+2}$ | | Zn | | $Fe^{+3}$ | |
| pH of Aq. Raffinate | [Cu]org | pH of Aq. Raffinate | [Ni]org | pH of Aq. Raffinate | [Co]org | pH of Aq. Raffinate | [Zn]org | pH of Aq. Raffinate | [Fe]org |
| 1.97 | 0.001 | 1.7 | <0.0005 | 1.6 | <0.0005 | 1.6 | <0.0005 | 1.4 | <0.0005 |
| 2.13 | 0.001 | 1.9 | 0.0006 | 1.9 | <0.0005 | 1.9 | <0.0005 | 1.5 | <0.0005 |
| 3.23 | 0.076 | 4.97 | 0.0031 | 3.5 | <0.0005 | 5.5 | 0.002 | 1.8 | <0.0005 |
| 3.3 | 1.50 | 6.46 | 0.047 | 6.7 | 0.035 | 5.9 | 0.005 | 2.0 | <0.0005 |
| 4.05 | 1.41 | 7.2* | 0.092 | 7.1 | 0.572 | 6.2* | 0.002 | 2.2 | <0.0005 |
| 4.8* | 3.00 | | | 7.2 | 1.52 | 6.3* | 0.0002 | | |
| | | | | 7.5* | 2.61 | | | | |

*Precipitate present

TABLE H

| 5-Chloro-2-(dodecylbenzenesulfonamido)benzophenone oxime in Kermac 470B | | | | | | | | | |
|---|---|---|---|---|---|---|---|---|---|
| Cu | | Ni | | $Co^{+2}$ | | Zn | | $Fe^{+3}$ | |
| pH of Aq. Raffinate | [Cu]org | pH of Aq. Raffinate | [Ni]org | pH of Aq. Raffinate | [Co]org | pH of Aq. Raffinate | [Zn]org | pH of Aq. Raffinate | [Fe]org |
| 1.67 | 0.106 | 1.6 | 0.046 | 0.7** | 0.001 | 0.9 | 0.002 | 0.7 | 0.002 |
| 1.71 | 0.111 | 1.7* | 0.059 | 1.5** | 0.035 | 1.6 | 0.047 | 1.2 | 0.030 |
| 3.1* | 0.390 | 6.4* | 0.234 | 1.6** | 0.056 | 1.9 | 0.061 | 1.4 | 0.036 |
| 3.2* | 0.456 | 6.6* | 0.292 | 6.0** | 0.205 | | | 1.6 | 0.059 |
| 3.9 | 1.16 | 6.9* | 0.890 | 6.2** | 0.240 | | | 1.6 | 0.071 |
| 4.0 | 1.91 | 7.0* | 1.64 | 6.8** | 0.905 | | | 1.8 | 0.086 |
| | | | | | | | | 2.0 | 0.120 |

*Precipitate present.
**Emulsion present.

TABLE I

| 2'-(Dodecylbenzenesulfonamido)acetophenone oxime in Exxon Aromatic 150 | | | | | | | | | |
|---|---|---|---|---|---|---|---|---|---|
| Cu | | Ni | | $Co^{+2}$ | | Zn | | $Fe^{+3}$ | |
| pH of Aq. Raffinate | [Cu]org | pH of Aq. Raffinate | [Ni]org | pH of Aq. Raffinate | [Co]org | pH of Aq. Raffinate | [Zn]org | pH of Aq. Raffinate | [Fe]org |
| 1.34 | <0.005 | 1.61 | <0.005 | 1.68 | <0.005 | 1.38 | <0.005 | 0.48 | <0.005 |
| 1.55 | <0.005 | 2.30 | <0.005 | 2.36 | <0.005 | 1.57 | <0.005 | 1.10 | <0.005 |
| 2.67 | 0.157 | 2.58 | <0.005 | 2.52 | <0.005 | 2.57 | <0.005 | 1.54 | <0.005 |
| 3.20 | 0.800 | 3.65 | <0.005 | 3.25 | <0.005 | 5.02 | <0.005 | 1.82 | <0.005 |
| 3.63* | 1.56 | 6.31 | 0.400 | 6.61 | 0.011 | 6.09* | <0.005 | 2.04 | <0.005 |
| 4.39* | 2.38 | 6.92 | 0.400 | 7.04 | 1.16 | | | 2.16 | <0.005 |

*Precipitate present.

TABLE J

| 2-(Dodecylbenzenesulfonamido)acetophenone oxime in Exxon Aromatic 150 | | | | | | | | | |
|---|---|---|---|---|---|---|---|---|---|
| Cu | | Ni | | $Co^{+2}$ | | Zn | | $Fe^{+3}$ | |
| pH of Aq. Raffinate | [Cu]org | pH of Aq. Raffinate | [Ni]org | pH of Aq. Raffinate | [Co]org | pH of Aq. Raffinate | [Zn]org | pH of Aq. Raffinate | [Fe]org |
| 1.38 | 0.068 | 1.66 | <0.005 | 1.71 | <0.005 | 1.47 | <0.005 | 0.5 | 0.010 |
| 1.62 | 0.092 | 3.01 | 0.018 | 2.89 | 0.010 | 1.76 | <0.005 | 1.06 | 0.017 |

TABLE J-continued

| 2-(Dodecylbenzenesulfonamido)acetophenone oxime in Exxon Aromatic 150 | | | | | | | | | |
|---|---|---|---|---|---|---|---|---|---|
| Cu | | Ni | | $Co^{+2}$ | | Zn | | $Fe^{+3}$ | |
| pH of Aq. Raffinate | [Cu]org | pH of Aq. Raffinate | [Ni]org | pH of Aq. Raffinate | [Co]org | pH of Aq. Raffinate | [Zn]org | pH of Aq. Raffinate | [Fe]org |
| 3.11 | 0.335 | 3.90 | 0.059 | 3.94 | 0.042 | 4.53 | 0.090 | 1.58 | 0.020 |
| 4.12* | 0.830 | 5.59 | 0.206 | 5.6 | 0.148 | 5.65 | 0.260 | 1.84 | 0.022 |
| 4.31 | 1.00 | 7.14 | 1.00 | 7.12* | 0.700 | 6.21* | 0.375 | 1.98 | 0.30 |
| 4.58 | 1.33 | 7.43 | 1.32 | 7.32* | 0.930 | 6.18* | 0.425 | 2.10 | 0.041 |

*Precipitate present.

EXAMPLE 13

Ammonia Isotherms

To determine the extent of extraction of various metal ions as a function of total ammonia concentration in the aqueous phase, tests were conducted in accordance with the following procedure. Portions of a 0.1 molar solution of a sulfonamido oxime compound in an identified essentially water-immiscible liquid hydrocarbon solvent were shaken at a 1:1 organic:aqueous phase ratio for one hour at ambient temperature with aqueous solutions made up as follows:

| Aqueous Solution | Metal Sulfate Concentration | $NH_3$ Concentration | $(NH_4)_2SO_4$ Concentration | Total $NH_3$ Concentration |
|---|---|---|---|---|
| 1 | 0.005M | 0.60M | 0.15M | 0.90M (15.3 gpl) |
| 2 | 0.005M | 1.20M | 0.30M | 1.80M (30.6 gpl) |
| 3 | 0.005M | 2.40M | 0.60M | 3.60M (61.2 gpl) |
| 4 | 0.005M | 3.60M | 0.90M | 5.40M (91.8 gpl) |
| 5 | 0.005M | 4.80M | 1.20M | 7.20M (122.4 gpl) |
| 6 | 0.005M | 6.00M | 1.50M | 9.00M (153.0 gpl) |

(A convenient procedure for the preparation of the aqueous solutions involves the preparation of a large batch of solution 6. That solution then is diluted with an appropriate amount of a 0.005 M metal sulfate solution. For example, one liter of aqueous $CuSO_4$ solution 4 can be prepared by diluting 600 ml. of aqueous $CuSO_4$ solution 6 to one liter with 0.005 M $CuSO_4$ in water.)

The separated organic and aqueous phases were analyzed for metal concentration generating the data contained in Tables K–N which demonstrate the degree of metal extraction as a function of ammonia concentration for the particular reagent systems under study. In the table concentrations are given in grams per liter unless otherwise indicated.

EXAMPLE 14

Acid Stripping, Ammonia Loading and Acid Loading

In order to determine (1) the extent of metal stripping as a function of acid concentration, (2) the extent of ammonia loading during extraction and (3) the extent of acid loading during stripping, the following tests were conducted. Organic reagent solutions as used in Example 17 and aqueous solutions having the following compositions were prepared:

A. a 0.1 M metal sulfate, 0.6 M $NH_3$ and 0.15 M $(NH_4)_2SO_4$ solution in water.

B. Four solutions containing 25, 50, 100 and 150 gpl $H_2SO_4$ in water.

In the first step, the reagent solution was shaken with aqueous solution A at an organic:aqueous phase volume ratio of 1:2 for one hour at ambient temperature. The phases were separated and the loaded organic phase was contacted a second time as before with fresh aqueous solution A. The resulting organic phase was separated and analyzed for metal concentration. The loaded organic phase was then divided into four parts each of which is shaken with one of the four aqueous B solutions at an organic:aqueous phase ratio of 1:1 for one hour at ambient temperature. The phases were then separated and the organics were analyzed for metal content while the aqueous phases were analyzed for ammonia concentration. Next, the stripped organic phases were washed with water at an organic:aqueous phase ratio of 1:1 for one hour and analyzed for $H_2SO_4$ concentration. The results of this procedure are disclosed in Table O.

TABLE K

| 2-(Dodecylbenzenesulfonamide)benzophenone oxime in Kermac 470B | | | | | | | | |
|---|---|---|---|---|---|---|---|
| Cu | | Ni | | $Co^{+3}$ | | Zn | |
| $[NH_3]$ | % Extraction | $[NH_3]$ | % Extraction | $[NH_3]$ | % Extraction | $[NH_3]$ | % Extraction |
| 14.7 | 97.0 | 15.1 | 96.3 | 14.3 | 74.2 | 14.5 | 56.8 |
| 30.0 | 78.8 | 30.0 | 81.1 | 29.9 | 71.2 | 28.9 | 28.6 |
| 59.5 | 28.0 | 60.0 | 35.3 | 57.9 | 52.6 | 58.3 | 13.9 |
| 86.0 | 13.2 | 89.5 | 16.8 | 86.8 | 35.3 | 87.2* | 8.7 |
| 113.9 | 9.0 | 118.6 | 12.2 | 115.4 | 24.2 | 116.2* | 7.4 |
| 141.9 | 7.1 | 149.6 | 9.9 | 148 | 11.2 | 147.0* | 5.7 |

*Precipitate or emulsion present.

TABLE L

| 5-Chloro-2-(dodecylbenzensulfonamido)benzophenone oxime in Kermac 470B | | | | | | | | |
|---|---|---|---|---|---|---|---|
| Cu | | Ni | | $Co^{+3}$ | | Zn | |
| $[NH_3]$ | % Extraction | $[NH_3]$ | % Extraction | $[NH_3]$ | % Extraction | $[NH_3]$ | % Extraction |
| 14.7 | 100.0 | 15.1 | 95.5 | 14.7 | 85.9 | 14.4 | 90.0 |
| 30.0 | 90.7 | 30.1 | 81.3 | 29.7 | 71.9 | 28.9 | 73.7 |
| 59.5 | 53.8 | 60.0 | 51.8 | 56.7 | 50.6 | 58.3 | 42.1 |
| 86.0 | 33.4 | 89.5 | 34.2 | 77.6 | 29.2 | 87.2 | 25.3 |

TABLE L-continued

| 5-Chloro-2-(dodecylbenzensulfonamido)benzophenone oxime in Kermac 470B | | | | | | | |
|---|---|---|---|---|---|---|---|
| Cu | | Ni | | Co$^{+3}$ | | Zn | |
| [NH$_3$] | % Extraction | [NH$_3$] | % Extraction | [NH$_3$] | % Extraction | [NH$_3$] | % Extraction |
| 113.9 | 21.1 | 118.6 | — | 102.6 | 18.2 | 116.2 | 15.1 |
| 141.9 | 14.4 | 149.6 | 16.3 | 129.2 | 10.9 | 147.0 | 10.0 |

TABLE M

| 2'-(Dodecylbenzenesulfonamide)acetophenone oxime in Exxon Aromatic 150 | | | | | | | |
|---|---|---|---|---|---|---|---|
| Cu | | Ni | | Co$^{+3}$ | | Zn | |
| [NH$_3$] | % Extraction | [NH$_3$] | % Extraction | [NH$_3$] | % Extraction | [NH$_3$] | % Extraction |
| 15.3 | 100 | 15.1 | 59.4 | 15.3 | 21.0 | 14.4 | 3.9 |
| 30.6 | 100 | 30.0 | 19.0 | 30.6 | 21.0 | 28.9 | 0.0 |
| 61.2 | 66.7 | 60.0 | 2.0 | 61.2 | 10.0 | 58.3 | 0.0 |
| 91.8 | 24.5 | 89.5 | 0.0 | 91.8 | 10.0 | 87.2 | 0.0 |
| 122.4 | 8.4 | 118.6 | 0.0 | 122.4 | 8.0 | 116.2 | 0.0 |
| 153.0 | 3.7 | 149.6 | 0.0 | 153.0 | — | 147.0 | 0.0 |

Table N

| 2-(Dodecylbenzenesulfonamido)acetophenone oxime | | | | | | | |
|---|---|---|---|---|---|---|---|
| Cu | | Ni | | Co$^{+3}$ | | Zn | |
| [NH$_3$] | % Extraction | [NH$_3$] | % Extraction | [NH$_3$] | % Extraction | [NH$_3$] | % Extraction |
| 15.3 | 100 | 15.1 | 79.3 | 15.3 | 97.8 | 14.4 | 90.9 |
| 30.6 | 100 | 30.0 | 70.0 | 30.6 | 97.0 | 28.9 | 75.6 |
| 61.2 | 96.7 | 60.0 | 55.7 | 61.2 | 93.0 | 58.3 | 48.2 |
| 91.8 | 89.3 | 89.5 | 17.1 | 91.8 | 94.9 | 87.2 | 28.6 |
| 122.4 | 80.9 | 118.6 | 13.2 | 122.4 | 94.2 | 116.2 | 17.5 |
| 153.0 | 72.4 | 149.6 | 10.2 | 153.0 | 81.8 | 147.0 | 10.0 |

TABLE O

| REAGENT | Solvent | Metal | [H$_2$SO$_4$] Aq. Strip Feed (gpl) | [M] Organic Feed (gpl) | [M] Organic Raffinate (gpl) | [NH$_3$] Aq.Strip Raffinate (gpl) | pH of Aqueous Scrub |
|---|---|---|---|---|---|---|---|
| 2-(Dodecylbenzenesulfonamido) benzophenone oxime | Kermac 470B | Cu | 25 | 5.22 | 0.290 | 0.85 | 7.1 |
| | | | 75 | 5.22 | 0.127 | 0.85 | 4.7 |
| | | | 150 | 5.22 | 0.043 | 0.85 | 4.7 |
| | | Co | 25 | 2.80 | 2.87 | 0.09 | 3.0 |
| | | | 75 | 2.80 | 2.42 | 0.07 | 2.0 |
| | | | 150 | 2.80 | 1.94 | 0.06 | 1.6 |
| | | Ni | 25 | 2.04 | <0.0005 | 1.27 | 7.9 |
| | | | 75 | 2.04 | <0.0005 | 1.36 | 8.4 |
| | | | 150 | 2.04 | <0.0005 | 1.36 | 8.3 |
| | | Zn | 25 | 1.55 | <0.0005 | 0.76 | 7.9 |
| | | | 75 | 1.55 | <0.0005 | 0.76 | 7.9 |
| | | | 150 | 1.55 | <0.0005 | 0.76 | 7.6 |
| 5-Chloro-2-(dodecylbenzene-sulfonamido)benzophenone oxime | Kermac 470B | Cu | 25 | 4.75 | 0.124 | 1.27 | — |
| | | | 75 | 4.75 | 0.018 | 1.27 | 2.6 |
| | | | 150 | 4.75 | 0.017 | 1.10 | 2.4 |
| | | Zn | 50 | 0.840 | 0.001 | 0.80 | 2.98 |
| | | | 75 | 0.840 | <0.0005 | 0.80 | — |
| | | | 150 | 0.840 | <0.0005 | 0.80 | 2.90 |

All concentrations given in grams per liter.

While the invention has now been described in terms of various preferred process parameters, and exemplified with respect thereto, the skilled artisan will appreciate that various substitutions, changes, omissions, and modifications may be made without departing from the spirit thereof. Accordingly, it is intended that the scope of the invention be limited solely by that of the following claims.

The embodiments of the present invention in which an exclusive property or privilege is claimed are defined as follows:

1. Compounds of the structure

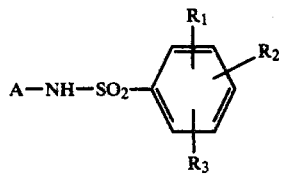

wherein A is a radical selected from the group consisting of

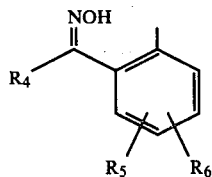

and

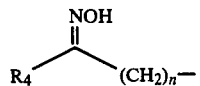

in which R₄ is a member selected from the group consisting of hydrogen, linear and branched chain alkyl containing from 1 to 20 carbon atoms and a radical of the structure

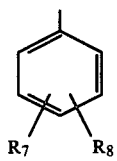

in which $R_7$ and $R_8$, which may be the same or different, are selected from the group consisting of hydrogen, linear and branched chain alkyl containing from 1 to 20 carbon atoms, halogen, nitro, nitrile, lower alkoxy and trifluoromethyl; $R_5$ and $R_6$, which may be the same or different, are selected from the group consisting of hydrogen, linear and branched chain alkyl containing from 1 to 20 carbon atoms, halogen, nitro, nitrile, lower alkoxy and trifluoromethyl; n is an integer of 1 or 2; and, $R_1$, $R_2$ and $R_3$, which may be the same or different, are selected from the group consisting of hydrogen and linear and branched chain alkyl containing from 1 to 20 carbon atoms; said compounds being further characterized as having solubilities of at least 2% by weight in essentially water-immiscible, liquid hydrocarbon solvents.

2. The compounds of claim 1, wherein said liquid hydrocarbon solvent is selected from the group consisting of aliphatic and aromatic hydrocarbons and mixtures thereof having flash points of at least 150° F. and further characterized in that the Cu⁺⁺ complexes thereof also have solubilities of at least 2% by weight in said liquid hydrocarbon solvents.

3. The compounds of claim 1, wherein at least one of $R_1$, $R_2$ and $R_3$ is a linear or branched chain alkyl containing at least 8 carbon atoms.

4. The compounds of claim 3, wherein one of $R_1$, $R_2$ and $R_3$ is dodecyl.

5. The compounds of claim 1, wherein one of $R_1$, $R_2$ and $R_3$ is methyl.

6. The compounds of claim 1, wherein A is a radical represented by the structure:

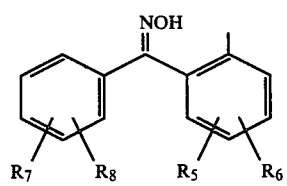

wherein $R_5$, $R_6$, $R_7$ and $R_8$ are as defined in claim 1.

7. The compounds of claim 6, wherein $R_5$, $R_6$, $R_7$ and $R_8$ are hydrogen.

8. The compounds of claim 6, wherein at least one of $R_5$, $R_6$, $R_7$ and $R_8$ is halogen.

9. The compounds of claim 8, wherein said halogen is chloro.

10. The compounds of claim 6, wherein one of $R_1$, $R_2$ and $R_3$ is dodecyl.

11. The compounds of claim 6, wherein one of $R_1$, $R_2$ and $R_3$ is methyl.

12. 2-(Dodecylbenzenesulfonamido)benzophenone oxime.

13. 5-Chloro-2-(dodecylbenzenesulfonamido) benzophenone oxime.

14. The compounds of claim 1, wherein A is a radical represented by the structure:

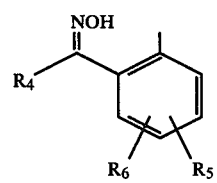

wherein R₄ is a linear or branched chain alkyl containing from 1 to 20 carbon atoms and $R_5$ and $R_6$ are as defined in claim 1.

15. The compounds of claim 14, wherein R₄ is methyl and $R_5$ and $R_6$ are hydrogen.

16. The compounds of claim 14, wherein one of $R_1$, $R_2$ and $R_3$ is dodecyl.

17. The compounds of claim 14, wherein one of $R_1$, $R_2$ and $R_3$ is methyl.

18. 2'-(Dodecylbenzenesulfonamido)acetophenone oxime.

19. The compounds of claim 1, wherein A is a radical represented by the structure:

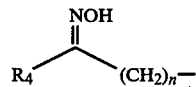

in which R₄ and n are as defined in claim 1.

20. The compounds of claim 19, wherein A is a radical represented by the structure:

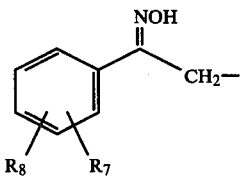

in which $R_7$ and $R_8$ are as defined in claim 1.

21. The compounds of claim 20, wherein $R_7$ and $R_8$ are hydrogen.

22. The compounds of claim 20, wherein one of $R_1$, $R_2$ and $R_3$ is dodecyl.

23. The compounds of claim 20, wherein one of $R_1$, $R_2$ and $R_3$ is methyl.

24. 2-(Dodecylbenzenesulfonamido)acetophenone oxime.

25. A composition of matter consisting essentially of a solution of a sulfonamido oxime in an essentially water-immiscible, liquid hydrocarbon solvent, said solution containing at least 2% by weight of said sulfonamido oxime, said sulfonamido oxime being selected from the compounds of the structure:

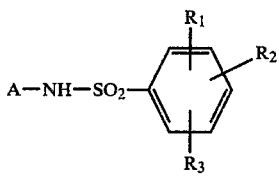

wherein A is a radical selected from the group consisting of:

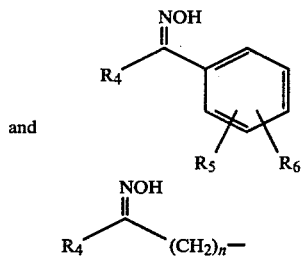

in which $R_4$ is a member selected from the group consisting of hydrogen, linear and branched chain alkyl containing from 1 to 20 carbon atoms and a radical of the structure

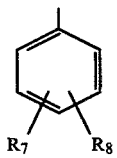

in which $R_7$ and $R_8$, which may be the same or different, are selected from the group consisting of hydrogen, linear and branched chain alkyl containing from 1 to 20 carbon atoms, halogen, nitro, nitrile, lower alkoxy and trifluoromethyl; $R_5$ and $R_6$, which may be the same or different, are selected from the group consisting of hydrogen, linear and branched chain alkyl containing from 1 to 20 carbon atoms, halogen, nitro, nitrile, lower alkoxy and trifluoromethyl; n is an integer of 1 or 2, and, $R_1$, $R_2$ and $R_3$, which may be the same or different, are selected from the group consisting of hydrogen and linear branched chain alkyl containing from 1 to 20 carbon atoms.

26. The composition of claim 25, wherein said solvent is selected from the group consisting of aliphatic and aromatic hydrocarbons and mixtures thereof, having flash points of at least 150° F. and further characterized in that the $Cu^{++}$ complexes of the sulfonamido oxime have a solubility in said solvent of at least 2% by weight.

27. The composition of claim 25, wherein said solvent is selected from the group consisting of aliphatic and aromatic kerosenes, benzene, toluene and xylene.

28. The composition of claim 25, wherein said sulfonamido oxime is present in an amount of about 2 to 75% by weight.

29. The composition of claim 25, wherein at least one of $R_1$, $R_2$ and $R_3$ is a linear or branched chain alkyl containing at least 8 carbon atoms.

30. The composition of claim 29, wherein one of $R_1$, $R_2$ and $R_3$ is dodecyl.

31. The composition of claim 25, wherein one of $R_1$, $R_2$ and $R_3$ is methyl.

32. The composition of claim 25, wherein A is a radical represented by the structure:

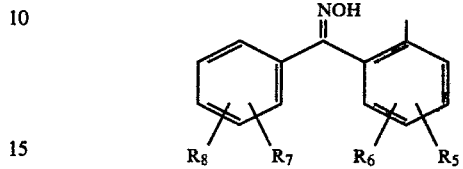

wherein $R_5$, $R_6$, $R_7$ and $R_8$ are as defined in claim 25.

33. The composition of claim 32, wherein $R_5$, $R_6$, $R_7$ and $R_8$ are hydrogen.

34. The composition of claim 32, wherein at least one of $R_5$, $R_6$, $R_7$ and $R_8$ is halogen.

35. The composition of claim 34, wherein said halogen is chloro.

36. The composition of claim 32, wherein one of $R_1$, $R_2$ and $R_3$ is dodecyl.

37. The composition of claim 32, wherein one of $R_1$, $R_2$ and $R_3$ is methyl.

38. The composition of claim 25, wherein said sulfonamido oxime is selected from the group consisting of 2-(Dodecylbenzenesulfonamido)benzophenone oxime, and 5-chloro-2-(dodecylbenzenesulfonamido)benzophenone oxime.

39. The composition of claim 25, wherein A is a radical represented by the structure:

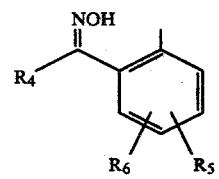

wherein $R_4$ is a linear or branched chain alkyl containing from 1 to 20 carbon atoms and $R_5$ and $R_6$ are as defined in claim 25.

40. The composition of claim 39, wherein $R_4$ is methyl and $R_5$ and $R_6$ are hydrogen.

41. The composition of claim 25, wherein said sulfonamido oxime is 2'-(Dodecylbenzenesulfonamido)acetophenone oxime.

42. The composition of claim 25, wherein A is a radical represented by the structure:

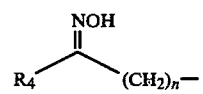

in which $R_4$ and n are as defined in claim 25.

43. The composition of claim 42, wherein A is a radical represented by the structure:

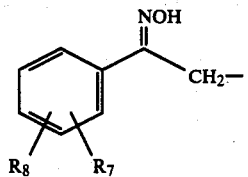

in which $R_7$ and $R_8$ are as defined in claim 25.

44. The composition of claim 43, wherein $R_7$ and $R_8$ are hydrogen.

45. The composition of claim 25, wherein said sulfonamido oxime is 2-(Dodecylbenzenesulfonamido) acetophenone oxime.

46. The composition of claim 25, wherein said composition additionally contains an amount of a metal complex of said sulfonamido oxime and a metal ion selected from the group consisting of $Cu^{++}$, $Ni^{++}$, $Co^{++}$, $Co^{+++}$ and $Zn^{++}$.

47. The composition of claim 46, wherein the metal ion and the sulfonamido oxime are present in a molar ratio up to about 1:2.

48. The complex of claim 46, wherein said metal ion is $Cu^{++}$.

49. A process of recovering metal values selected from the group consisting of $Cu^{++}$, $Ni^{++}$, $Zn^{++}$, $Co^{++}$ and $Co^{+++}$, from aqueous solutions thereof which comprises contacting the said aqueous solutions with a solution of a sulfonamido oxime in an essentially water-immiscible, liquid hydrocarbon solvent to extract at least a portion of the metal values into the organic phase, separating the loaded organic phase from the aqueous phase and stripping at least a portion of the metal value from the organic phase into an aqueous stripping medium, said process being further characterized in that said sulfonamido oxime and the metal complex thereof formed during the extraction step have solubilities of at least 2% by weight in the essentially water-immiscible, liquid hydrocarbon solvent and the starting aqueous solution is of composition and pH for each metal value such as to allow at least a portion of the said metal value to be extracted by the sulfonamido oxime.

50. The process of claim 49, wherein the essentially water-immiscible, liquid hydrocarbon solvent is selected from the group consisting of aliphatic and aromatic hydrocarbons and mixtures thereof having flash points of at least 150° F.

51. The process of claim 49, wherein the sulfonamido oxime is present in the essentially water-immiscible, liquid hydrocarbon solvent in an amount of about 2 to 75% by weight.

52. The process of claim 51, wherein said amount is about 5 to 20% by weight.

53. The process of claim 49, wherein the metal value being extracted is $Cu^{++}$.

54. The process of claim 53, wherein the aqueous $Cu^{++}$ containing solution is acidic.

55. The process of claim 53, wherein the aqueous $Cu^{++}$ containing solution is an ammoniacal solution.

56. The process of claim 49, wherein the metal value being extracted is selected from the group consisting of $Ni^{++}$, $Zn^{++}$, $Co^{++}$ and $Co^{+++}$.

57. The process of claim 56, wherein the aqueous metal value containing solution is an ammoniacal solution.

58. The process of claim 49, wherein the aqueous stripping medium is acidic.

59. The process of claim 58, wherein the aqueous stripping medium is an aqueous sulfuric acid solution.

60. The process of claim 49, wherein the sulfonamido oxime is selected from compounds of the structure:

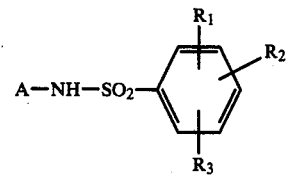

wherein A is a radical selected from the group consisting of

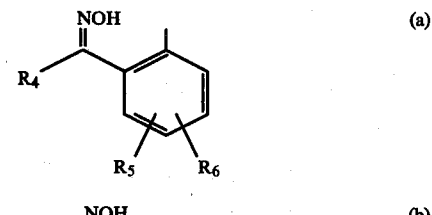

and

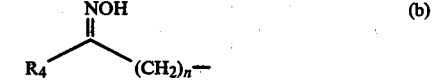

in which $R_4$ is a member selected from the group consisting of hydrogen, linear and branched chain alkyl containing from 1 to 20 carbon atoms and a radical of the structure

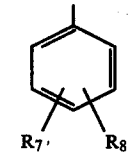

in which $R_7$ and $R_8$, which may be the same or different, are selected from the group consisting of hydrogen, linear and branched chain alkyl containing from 1 to 20 carbon atoms, halogen, nitro, nitrile, lower alkoxy and trifluoromethyl; $R_5$ and $R_6$, which may be the same or different, are selected from the group consisting of hydrogen, linear and branched chain alkyl containing from 1 to 20 carbon atoms, halogen, nitro, nitrile, lower alkoxy and trifluoromethyl; n is an integer of 1 or 2; and, $R_1$, $R_2$ and $R_3$, which may be the same or different, are selected from the group consisting of hydrogen and linear and branched chain alkyl containing from 1 to 20 carbon atoms; said compounds being further characterized as having solubilities of at least 2% by weight in the essentially water-immiscible, liquid hydrocarbon solvent.

61. The process of claim 60, wherein at least one of $R_1$, $R_2$ and $R_3$ is a linear or branched chain alkyl containing at least 8 carbon atoms.

62. The process of claim 61, wherein said alkyl in branched chain.

63. The process of claim 61, wherein one of $R_1$, $R_2$ and $R_3$ is dodecyl.

64. The process of claim 60, wherein one of $R_1$, $R_2$ and $R_3$ is methyl.

65. The process of claim 60, wherein said liquid hydrocarbon solvent is selected from the group consisting of aliphatic and aromatic hydrocarbons and mixtures thereof having flash points of at least 150° F.

66. The process of claim 60, wherein A is a radical represented by the structure:

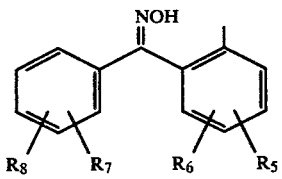

wherein $R_5$, $R_6$, $R_7$ and $R_8$ are as defined in claim 60.

67. The process of claim 66, wherein $R_5$, $R_6$, $R_7$ and $R_8$ are hydrogen.

68. The process of claim 66, wherein at least one of $R_5$, $R_6$, $R_7$ and $R_8$ is halogen.

69. The process of claim 68, wherein said halogen is chloro.

70. The process of claim 66, wherein one of $R_1$, $R_2$ and $R_3$ is dodecyl.

71. The process of claim 66, wherein one of $R_1$, $R_2$ and $R_3$ is methyl.

72. The process of claim 60, wherein said sulfonamido oxime is selected from the group consisting of 2-(Dodecylbenzenesulfonamido)benzophenone oxime, and 5-Chloro-2-(dodecylbenzenesulfonamido)benzophenone oxime.

73. The process of claim 60, wherein A is a radical represented by the structure:

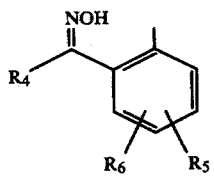

wherein $R_4$ is a linear or branched chain alkyl containing from 1 to 20 carbon atoms and $R_5$ and $R_6$ are as defined in claim 60.

74. The process of claim 73, wherein $R_4$ is methyl and $R_5$ and $R_6$ are hydrogen.

75. The process of claim 73, wherein one of $R_1$, $R_2$ and $R_3$ is dodecyl.

76. The process of claim 73, wherein one of $R_1$, $R_2$ and $R_3$ is methyl.

77. The process of claim 60, wherein said sulfonamido oxime is 2'- (Dodecylbenzenesulfonamido)acetophenone oxime.

78. The process of claim 60, wherein A is a radical represented by the structure:

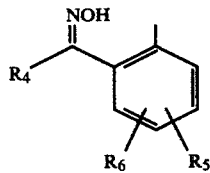

in which $R_4$ and n are defined in claim 60.

79. The process of claim 60, wherein A is a radical represented by the structure:

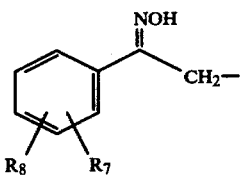

in which $R_7$ and $R_8$ are as defined in claim 60.

80. The process of claim 79, wherein $R_7$ and $R_8$ are hydrogen.

81. The process of claim 79, wherein one of $R_1$, $R_2$ and $R_3$ is dodecyl.

82. The process of claim 79, wherein one of $R_1$, $R_2$ and $R_3$ is methyl.

83. The process of claim 60, wherein said sulfonamido oxime is 2- (Dodecylbenzenesulfonamido)acetophenone oxime.

* * * * *

UNITED STATES PATENT AND TRADEMARK OFFICE
CERTIFICATE OF CORRECTION

PATENT NO. : 4,160,807
DATED : 10 July 1979
INVENTOR(S) : VIRNIG, Michael J.; MAC KAY, Kenneth D.

It is certified that error appears in the above-identified patent and that said Letters Patent are hereby corrected as shown below:

Abstract: next to last line, "mertal" instead of ...metal...
Column 7-8, line 35    Term "Aromatic" should be above "Hydrocarbon" in third column of Table instead of over "Olefin"
Column 7-8, Table A    "Yield" should read ...Yield %...(last column)
Column 9, line 46    Under "Acid (m)" column, "5:82" should read ...5.82...
Column 16, Table g    Under Zn[ZN]org., "0.0002" should read ...0.002...
Column 18, Table K and
Column 19, Table M: "2-dodecylbenzenesulfonamide" should read
    ...2-dodecylbenzenesulfonamido...
Column 19, Table L    Under Ni extraction    "-" should read ...31...
Column 19, Table N    Under Cu, "Extraction" column should read
    ...% Extraction...
Column 28, Claim 78    Structure should read as follows:

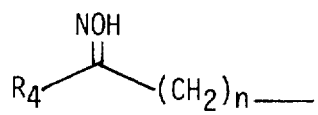

also: "are defined" should read    ...are as defined...

Signed and Sealed this

Thirtieth Day of September 1980

[SEAL]

Attest:

SIDNEY A. DIAMOND

Attesting Officer          Commissioner of Patents and Trademarks